United States Patent
Carro et al.

(10) Patent No.: US 8,467,420 B2
(45) Date of Patent: Jun. 18, 2013

(54) SYSTEMS AND METHODS FOR SYNCHRONIZING VARIOUS TYPES OF DATA ON A SINGLE PACKET

(75) Inventors: Eduardo M. Carro, Sarasota, FL (US); Endre Berecz, Bradenton, FL (US)

(73) Assignee: L-3 Communications Corporation, Sarasota, FL (US)

(*) Notice: Subject to any disclaimer, the term of this patent is extended or adjusted under 35 U.S.C. 154(b) by 175 days.

(21) Appl. No.: 13/177,136

(22) Filed: Jul. 6, 2011

(65) Prior Publication Data

US 2013/0010812 A1    Jan. 10, 2013

(51) Int. Cl.
 *H04J 3/06*    (2006.01)
(52) U.S. Cl.
 USPC ............ 370/512; 370/503; 370/392; 702/89; 701/33.4
(58) Field of Classification Search
 None
 See application file for complete search history.

(56) References Cited

U.S. PATENT DOCUMENTS

| | | | |
|---|---|---|---|
| 3,140,874 A | 7/1964 | Jensen et al. | |
| 4,644,494 A | 2/1987 | Muller | |
| 4,951,263 A | 8/1990 | Shope | |
| 5,218,366 A | 6/1993 | Cardamone et al. | |
| 5,517,199 A | 5/1996 | DiMattei | |
| H1560 H | 7/1996 | Gill et al. | |
| RE35,590 E | 8/1997 | Bezos et al. | |
| 6,148,179 A * | 11/2000 | Wright et al. ................ | 455/66.1 |
| 6,153,720 A | 11/2000 | Olzak et al. | |
| 6,275,164 B1 | 8/2001 | MacConnell et al. | |
| 6,410,995 B1 | 6/2002 | Grouse et al. | |
| 6,424,884 B1 | 7/2002 | Brooke, Jr. et al. | |
| 6,741,896 B1 | 5/2004 | Olzak et al. | |
| 7,208,685 B2 | 4/2007 | Browning et al. | |
| 7,664,057 B1 | 2/2010 | Wu et al. | |
| 7,746,751 B2 | 6/2010 | Kato et al. | |
| 2002/0035416 A1 | 3/2002 | De Leon | |
| 2002/0144834 A1 | 10/2002 | Purdom | |
| 2003/0018662 A1 | 1/2003 | Li | |
| 2003/0093187 A1 | 5/2003 | Walker | |
| 2003/0152145 A1 | 8/2003 | Kawakita | |
| 2004/0230352 A1 | 11/2004 | Monroe | |
| 2007/0124042 A1 * | 5/2007 | Monroe ......................... | 701/35 |
| 2008/0147267 A1 * | 6/2008 | Plante et al. .................. | 701/35 |

(Continued)

OTHER PUBLICATIONS

Schofield, D.W. "Feasibility of Battery Backup for Flight Recorders", Intl. Symposium on Transportation Recorders; May 3-5, 1999, Arlington, VA.

(Continued)

*Primary Examiner* — Duc C Ho
(74) *Attorney, Agent, or Firm* — Fox Rothschild, LLP; Robert J. Sacco

(57) ABSTRACT

Data recording systems and methods for synchronizing data of a plurality of different data types on a single packet. The methods involve: receiving the data and an audio frame containing voice data and timing data communicated over a plurality of channels; generating, in response to the reception of the audio frame, a combined packet on which the audio frame and at least a portion of the data are time synchronized to each other; and substantially simultaneously storing the combined packet in a primary data store and a secondary data store of a data recorder for subsequent use in reconstructing events leading up to a crash of a land vehicle, aircraft or vessel. The portion of data may include data link data, flight data and/or image/video data. The channels may include a cockpit channel and a plurality of pilot channels.

20 Claims, 6 Drawing Sheets

U.S. PATENT DOCUMENTS

| | | |
|---|---|---|
| 2008/0304474 A1 | 12/2008 | Lam |
| 2009/0112381 A1 | 4/2009 | Schwinn et al. |
| 2009/0277683 A1 | 11/2009 | Winterhalter et al. |
| 2009/0319102 A1 | 12/2009 | Winterhalter et al. |
| 2009/0322521 A1 | 12/2009 | Jacobson |
| 2010/0063654 A1 | 3/2010 | Winterhalter et al. |
| 2010/0073493 A1 | 3/2010 | Godfrey et al. |

OTHER PUBLICATIONS http://www.ntsb.gov/aviation; Cockpit Voice Recorders (CVR) and Flight Data Recorders (FDR); Reviewed Sep. 2004.

Information about Related Patents and Patent Applications, see section 6 of the accompanying Information Disclosure Statement Letter, which concerns Related Patents and Patent Applications, U.S. Appl. No. 12/142,129, filed Jun. 19, 2008; U.S. Appl. No. 12/206,585, filed Sep. 8, 2008; U.S. Appl. No. 13/021,133, filed Feb. 4, 2011; U.S. Appl. No. 13/177,136, filed Jul. 6, 2011.

International Search Report mailed Sep. 25, 2012, International Application No. PCT/US2012/024047 in the name of L-3 Communications Corporation, et al.

* cited by examiner

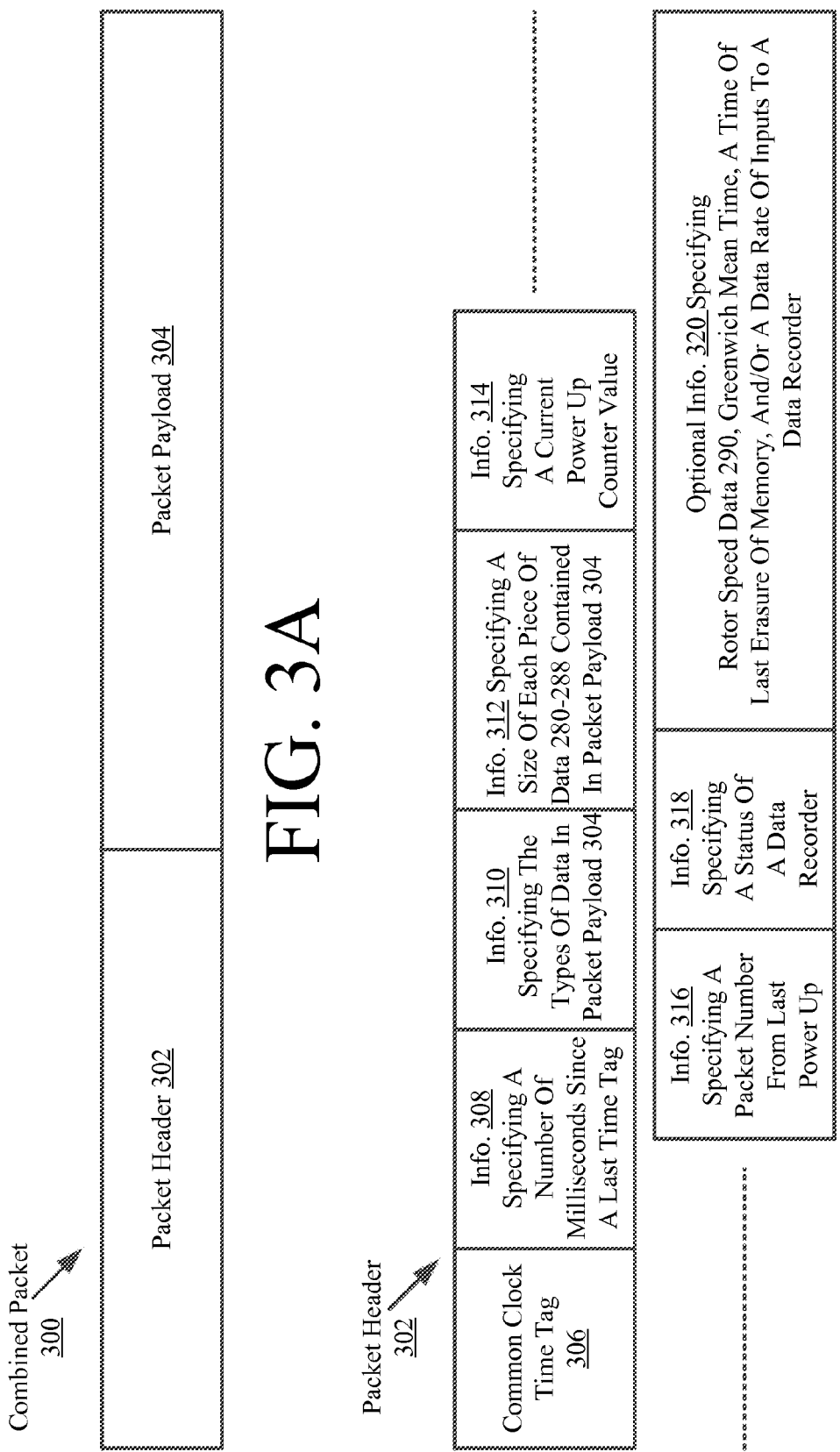

SYSTEMS AND METHODS FOR SYNCHRONIZING VARIOUS TYPES OF DATA ON A SINGLE PACKET

BACKGROUND OF THE INVENTION

1. Statement of the Technical Field

The invention concerns data recording systems. More particularly, the invention concerns data recording systems and methods for synchronizing data of a plurality of different data types (e.g., audio data, data link data, flight data, and image/video data) on a single packet.

2. Description of the Related Art

There are many conventional data recorders that are known in the art. Some of these data recorders are Flight Data Recorders ("FDRs") designed to meet a Technical Standard Order ("TSO"). The TSO refers the performance specifications and design requirements to a EUROCAE ED-112 document. In the EUROCAE ED-112 document, there is a requirement to physically segregate various types of data that are being recorded in a data store of an FDR.

The physical segregation is achieved by storing a particular type of data in a respective memory chip of a plurality of memory chips of the data store. The data types include, but are not limited to, voice data communicated over a cockpit channel, voice data communicated over pilot channels, flight data, data link data, and image/video data. The flight data includes, but is not limited to, engine speed data, wing flap position data, aileron position data and ruder position data. The data link data includes, but is not limited to, data defining information sent between an aircraft and an air traffic controller. Such information includes, but is not limited to, location information, speed information, altitude information, traffic instruction information, direction information, targeting information, control information and/or telemetry information.

The physically segregation of data provides a high degree of assurance that at least some of the data types would be recoverable in the event of a crash. For example, if a memory chip of the data store is damaged during a crash, then only one type of data would not be recoverable. In this scenario, the other types of data could be recovered and used to reconstruct the events leading up to the crash since the memory chips in which these other types of data were stored were not damaged during the crash.

In order to reconstruct the events leading up to a crash, the recoverable data needs to be synchronized to each other. This synchronization is typically performed by analyzing content of the recoverable data manually by an operator or automatically by a software program. Notably, the manual synchronization process is time consuming and costly. The automatic synchronization process is relatively complex and computationally intensive.

SUMMARY OF THE INVENTION

Embodiments of the present invention concern implementing systems and methods for synchronizing data of a plurality of different data types (e.g., data link data, flight data, and image/video data) on a single packet. The methods involve receiving the data and an audio frame by a data recorder. The audio frame contains voice data and timing data communicated over a plurality of channels (e.g., a cockpit channel and a plurality of pilot channels). In response to the reception of the audio frame, the data recorder generates a combined packet using the audio frame and at least a portion of the data. The combined packet is generated by encapsulating a packet payload with a packet header including a common clock time tag. The common clock time tag provides a means for time synchronizing the audio frame and the portion of data on the combined packet. The combined packet is then substantially simultaneously stored in a primary data store and a secondary data store of the data recorder. The stored combined packet may then be subsequently used in reconstructing events leading up to a crash of a land vehicle, aircraft or vessel.

According to aspects of the present invention, the packet header comprises information specifying at least one of the plurality of different data types, a current power up counter value, a packet number from a last power up, a number of milliseconds since a last time tag generation, a size of the audio frame, and a size of each type of data which has been buffered by the data recorder during a last "N" (e.g., 40) milliseconds. The packet header may also comprise at least one of rotor speed data, Greenwich mean time data, data specifying a time of a last erasure of memory, and/or data specifying a data rate of inputs to the data recorder.

According to other aspects of the present invention, the packet payload comprises the audio frame and the portion of data. The portion of data comprises data link and timing data which was buffered by the data recorder during a last "N" (e.g., 40) milliseconds, flight and timing data which was buffered by the data recorder during a last "N" (e.g., 40) milliseconds, and an "N" (e.g., 40) millisecond fraction of a video frame defined by image/video and timing data buffered by the data recorder.

BRIEF DESCRIPTION OF THE DRAWINGS

Embodiments will be described with reference to the following drawing figures, in which like numerals represent like items throughout the figures, and in which:

FIG. 3A is a schematic illustration of an exemplary combined packet that is useful for understanding the present invention.

FIG. 3B is a schematic illustration of an exemplary packet header that is useful for understanding the present invention.

DETAILED DESCRIPTION

Figure 1:
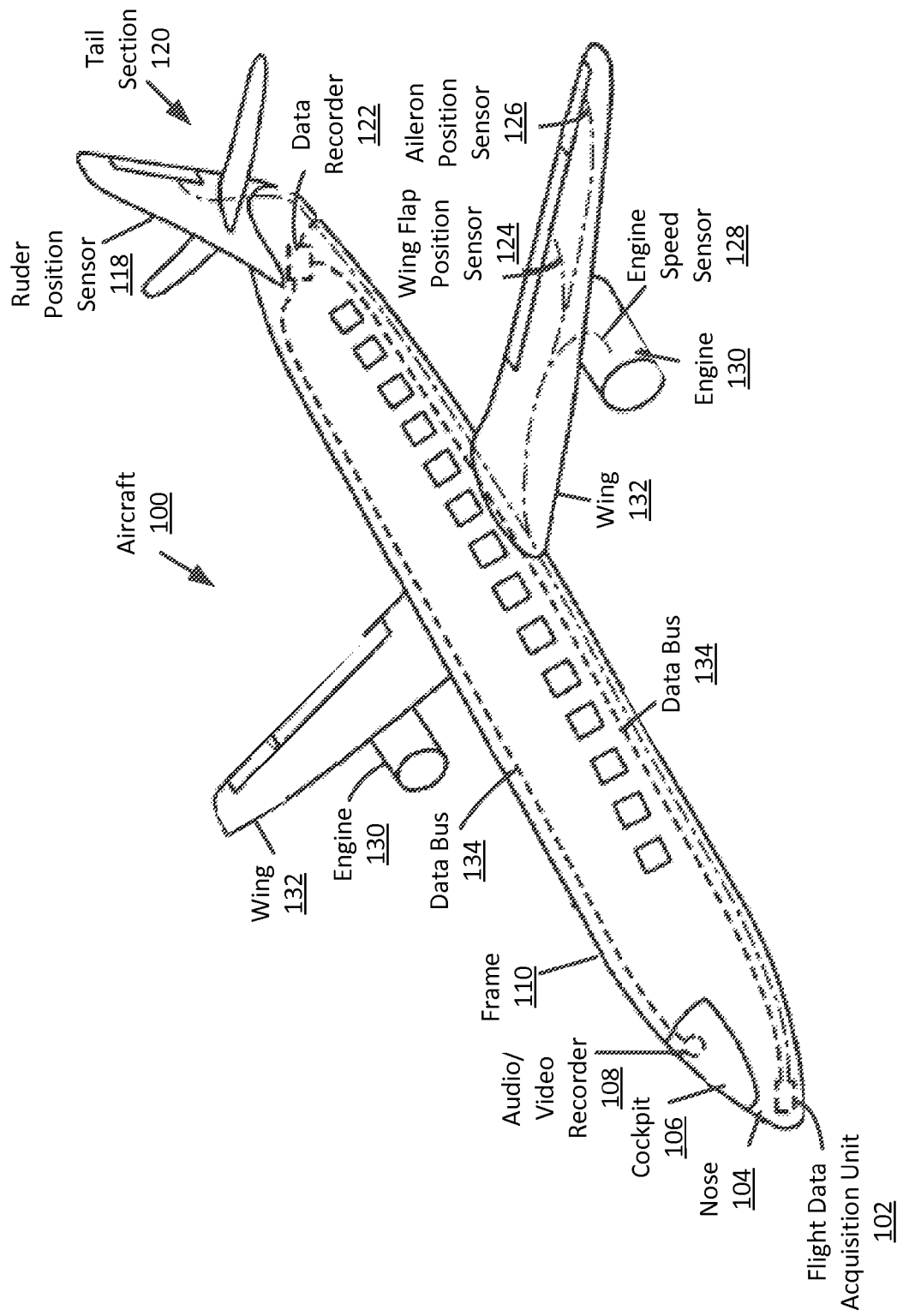
FIG. 1 is a perspective view of an exemplary aircraft with a flight data recorder that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for synchronizing a plurality of different types of data on a single packet. The methods generally involve receiving the data and an audio frame by a data recorder. The audio frame contains voice data and timing data communicated over a plurality of channels. In response to the reception of the audio frame, the data recorder generates a combined packet using the audio frame and at least a portion of the data. The combined packet is generated by encapsulating a packet payload with a packet header including a common clock time tag. The common clock time tag provides a means for time synchronizing the audio frame and the portion of data on the combined packet. The combined packet is then substantially simultaneously stored in a primary data store and a secondary data store of the data recorder. The stored combined packet may then be subsequently used in reconstructing events leading up to a crash of a land vehicle, aircraft or vessel Notably, the present invention overcomes various drawbacks of conventional data recorders. For example, the present invention provides a way to synchronize data which does not require a manual or automatic data synchronization process to be performed after a crash. As such, the present invention provides a data synchronization process that is less time consuming, costly, complex and computationally intensive as compared to conventional data synchronization processes (such as those described above in the background section of this document). Also, the present invention employs less memory devices as compared to conventional data recorders. Accordingly, the present invention has a lower circuit complexity, higher inherent reliability and improved storage latency as compared to those of conventional data recorders.

The present invention can be used in a variety of applications. Such applications include, but are not limited to, flight data recorder applications, voyage data recorder applications and land vehicle data recorders. Exemplary implementing system embodiments of the present invention will be described below in relation to FIGS. 1-3C. Exemplary method embodiments of the present invention will be described below in relation to FIGS. 4-5. The present invention will be described below in relation to data recorders for aircrafts. The invention is not limited in this regard. For example, the present invention can also be used with data recorders for vessels and land vehicles.

Exemplary Systems Implementing the Present Invention

Referring now to FIG. 1, there is provided a perspective view of a commercial aircraft 100 that implements the present invention. The aircraft 100 is generally a vehicle that is able to fly by being supported by air. The aircraft 100 counters the force of gravity by using the downward thrust from engines. Accordingly, the aircraft 100 comprises a nose section 104, a cockpit 106, a fuselage or airframe 110, a tail section 120, wings 132 and engines 130.

A Flight Data Acquisition Unit (FDAU) 102 is positioned in the nose section 104 of the aircraft 100 to acquire flight information from corresponding sensors located throughout the aircraft 100. Such flight information can include, but is not limited to, air speed, altitude, vertical acceleration, time, magnetic heading, control-column position, rudder-pedal position, control-wheel position, wing flap position, horizontal stabilizer, fuel flow and landing gear position. FDAUs 102 are well known in the art, and therefore will not be described in detail herein.

Sensors are placed on critical surfaces and system components of the aircraft 100 to convert real-time physical flight measurements into electrical signals for the FDAU 102. Typical aircraft sensors include an engine speed sensor 128, a wing flap position sensor 124, an aileron position sensor 126 and a rudder position sensor 118. The aircraft sensors 118 and 124-128 can be connected to the FDAU 102 through a fly-by-wire data bus 134 or wireless channel. The aircraft sensors 118 and 124-128 are well known in the art, and therefore will not be described in detail herein.

An Audio/Video Recorder (AVR) 108 is provided in the aircraft 100 to collect other flight related information, such as audio data, video data and associated timing data. The AVR 108 can be located in the cockpit, passenger area, cargo hold or landing gear compartment of the aircraft 100. AVRs 108 are well known in the art, and therefore will not be described in detail herein.

The FDAU 102 and AVR 108 route flight related information to a Data Recorder (DR) 122 via the data bus 134, direct link or wireless transmission. DR 122 is mounted to the airframe 110, typically in the tail section of the aircraft to maximize survivability. DR 122 is applicable to fixed wing and rotor aircraft, including commercial jets, military aircraft, drones, ultra-light aircraft, blimps, balloons and flying wings. The DR 122 can also be adapted to marine transportation systems such as boats, submarines, hovercraft, also spanning to pleasure/recreational, scientific, commercial, land-based vehicles and space travel. Further details of the DR 122 are shown in FIG. 2.

Figure 2:
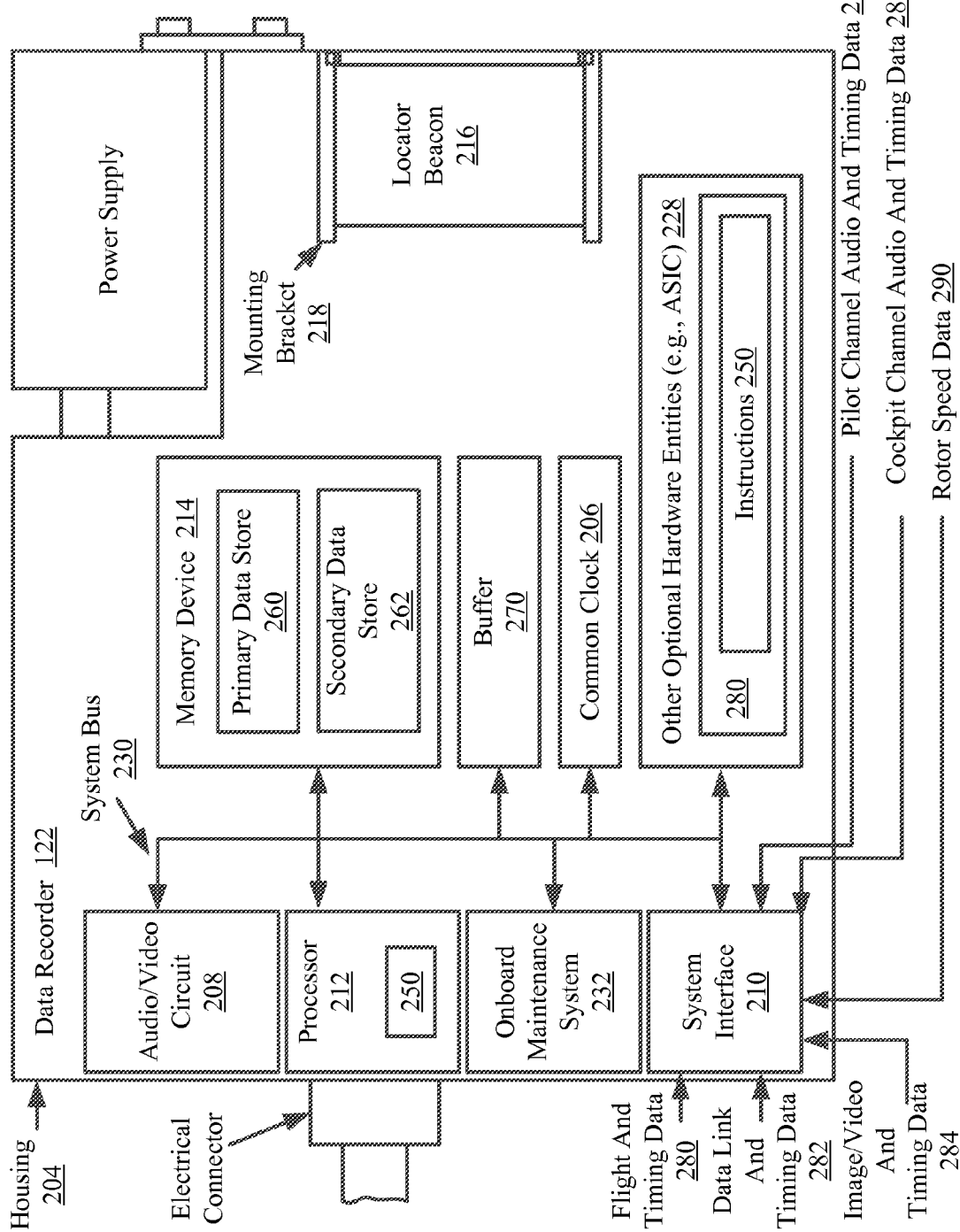
FIG. 2 is a detailed block diagram of an exemplary data recorder that is useful for understanding the present invention.

FIG. 2 is a detailed block diagram of an exemplary embodiment of the DR 122 that is useful for understanding the present invention. As shown in FIG. 2, the DR 122 comprises a plurality of components 204-270, which may be implemented as hardware (e.g., an electronic circuit), software and/or a combined thereof. The components include a system interface 210, a processor 212, at least one audio/video circuit 208, an Onboard Maintenance System (OMS) 232, a system bus 230, a memory device 214 connected to and accessible by other portions of the DR 122 through system bus 230, a buffer 270, a common clock 206, hardware entities 228 connected to system bus 230, and a locator beacon 216. The DR 122 can include more or less components than those shown in FIG. 2. However, the components shown are sufficient to disclose an illustrative embodiment implementing the present invention. The hardware architecture of FIG. 2 represents one embodiment of a representative DR configured to generate a combined packet in which a plurality of different types of data are synchronized. As such, the DR 122 implements method embodiments of the present invention. Exemplary method embodiments will be described in detail below in relation to FIGS. 4-5.

System interface 210 allows the DR 122 to communicate directly or indirectly with external devices, such as the FDAU 102 of FIG. 1 and the AVR 108 of FIG. 1. During operation of the DR 122, the system interface 210 receives various types of data communicated thereto by the external devices over the data bus 134 of FIG. 1. The data includes, but is not limited to, flight and timing data 280, data link and timing data 282, image/video and timing data 284, pilot channel audio and timing data 286, cockpit channel and timing data 288, and rotor speed data 290. This received data is then sent from the system interface 210 to the buffer 270 for temporary storage therein. The buffered data is used in a subsequent common packet generation process. An exemplary common packet generation process will be described below in relation to FIGS. 4-5.

Processor 212 can be programmed for facilitating the common packet generation operations of the present invention. In this regard, it should be understood that the processor 212 can access and run packet generation applications (not shown in FIG. 2) and other types of applications installed on the DR 122. The packet generation applications are operative to facilitate the synchronization of various types of data 280-290 on a single common packet, storing the common packet in the primary data store 260 of the memory device 214, and storing a redundant copy of the common packet in the secondary data store 262 of the memory device 214. The structure of the common packet will be described in detail below in relation to FIGS. 3A-3C. Still, it should be noted that the common packet includes a common clock time tag generated using common clock 206. The common clock time tag provides a common clock reference for the various types of data 280-290 contained in the common packet.

The OMS 232 is programmed to facilitate health monitoring operations of the DR 122. In this regard, it should be understood that the OMS 232 can access and run health monitoring applications (not shown in FIG. 2) and other types of applications installed on the DR 122. The health monitoring applications are operative to report the health of the DR 122 to external devices (e.g., a computing device in the cockpit 106 of the aircraft 100 of FIG. 1) for analysis. A health report for the DR 122 can include, but is not limited to, the following information: an identifier; a date of manufacture; an expiration date; and/or at least one detected condition thereof. The OMS 232 may provide said health reports on a periodic basis (e.g., once per second).

Hardware entities 228 can include microprocessors, Application Specific Integrated Circuits (ASICs) and other hardware. At least some of the hardware entities 228 perform actions involving access to and use of memory device 214 and buffer 270. Memory device 214 can be a Random Access Memory (RAM), a disk driver and/or a Compact Disc Read Only Memory (CD-ROM). In this regard, the hardware entities 228 comprise a computer-readable storage medium 280 on which is stored one or more sets of instructions 250 (e.g., software code) configured to implement one or more of the methodologies, procedures, or functions described herein. The instructions 250 can also reside, completely or at least partially, within the memory device 214, the processor 212, and/or the OMS 232 during execution thereof by the DR 122. The components 214, 212, 232 also can constitute machine-readable media. The term "machine-readable media", as used here, refers to a single medium or multiple media (e.g., a centralized or distributed database, and/or associated caches and servers) that store the one or more sets of instructions 250. The term "machine-readable media", as used here, also refers to any medium that is capable of storing, encoding or carrying a set of instructions 250 for execution by the DR 122 and that cause the DR 122 to perform any one or more of the methodologies of the present disclosure.

As shown in FIG. 2, the locator beacon 216 is disposed internal to the DR 122. More particularly, the locator beacon 216 is mechanically coupled to an inner surface of the housing 204 of the DR 122 via a mounting bracket 218. The mounting bracket 218 may comprise a removable retaining plate for facilitating the placement of the locator beacon 216 in the mounting bracket 218 and for retaining the locator beacon 216 within the mounting bracket 218. Embodiments of the present invention are not limited in this regard. For example, the locator beacon 216 can be disposed external to the DR 122. In this scenario, the locator beacon 216 can be mechanically coupled to an outer surface of the housing 204 via mounting bracket 218. However, there are many known advantages of locating the locator beacon 216 internal to the DR 122.

Notably, the DR 122 includes less data stores than conventional data recorders. In this regard, it should be understood that conventional data recorders typically comprise one or more data stores for each type of data 280-288 so that each type of data can be stored separate from other types of data as required by the EUROCAE ED-112 document. In contrast, the DR 122 only includes two (2) data stores, namely a primary data store 260 for storing common packets and a second data store 262 for storing redundant copies of the common packets. As a consequence of reducing the number of data stores, the DR 122 has a lower circuit complexity, higher inherent reliability and improved storage latency as compared to that of conventional data recorders.

Figure 3C:
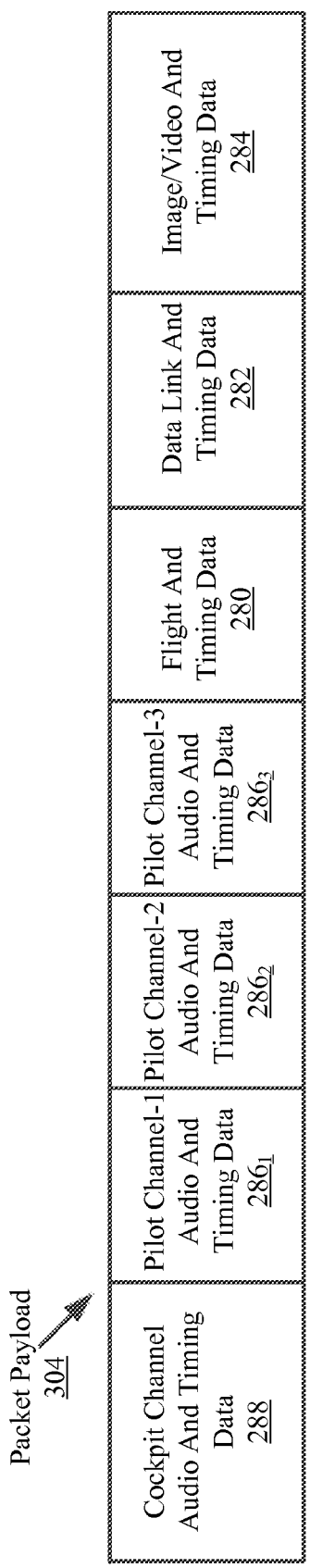
FIG. 3C is a schematic illustration of an exemplary packet payload that is useful for understanding the present invention.

Referring now to FIGS. 3A-3C, there is provided a schematic illustration of an exemplary combined packet 300 that is useful for understanding the present invention. As shown in FIG. 3A, the combined packet 300 comprises a packet header 302 and a packet payload 304. A schematic illustration of the packet header 302 is provided in FIG. 3B. A schematic illustration of the packet payload 304 is provided in FIG. 3C.

As shown in FIG. 3B, the packet header 302 comprises a common clock time tag 306 and various other information 308-318. Such information can include, but is not limited to, information 308 specifying a number of milliseconds since a last time tag generation, information 310 specifying the types of data contained in the packet payload 304, information 312 specifying a size of each piece of data 280-288 contained in the packet payload 304, information 314 specifying a current power up counter value, information 316 specifying a packet number from a last power up, and/or information 318 specifying a status of the DR 122. Optional information 320 may also be included in the packet header 302. The optional information 320 can include, but is not limited to, rotor speed data 290, a Greenwich mean time data, data specifying a time of a last erasure of memory, and/or data specifying a data rate of inputs to the DR 122. Notably, the order in which the data components 306-320 are arranged within the packet header 302 is not limited to that shown in FIG. 3B. The data components 360-320 can be arranged in any order selected in accordance with a particular DR 122 application.

As shown in FIG. 3C, the packet payload 304 comprises various types of data 280-288. The data includes, but is not limited to, cockpit channel audio and timing data 288, pilot channel-1 audio and timing data $286_1$, pilot channel audio and timing data $286_2$, pilot channel-3 audio and timing data $286_3$, flight and timing data 280, data link and timing data 282, and image/video and timing data 284. Each of the listed types of data 280-288 is well known in the art, and therefore will not be described herein. Notably, the order in which the data components 280-288 are arranged within the packet payload 304 is not limited to that shown in FIG. 3B. The data components 280-288 can be arranged in any order selected in accordance with a particular DR 122 application.

Although each of the data portions 280-288 of the packet payload 304 includes its own timing data generated using a respective clock of a plurality of different clocks, the data portions 280-288 are synchronized to each other via the time tag 306 contained in the packet header 302. As noted above, the time tag 306 is generated using a common clock 206 of the DR 122. Accordingly, the common packet 300 provides a means for synchronizing various types of data 280-288 on a single packet. This single packet synchronization means provides a DR 122 which overcomes various drawbacks of conventional data recorders. For example, conventional manual or complex automated methods are no longer required to synchronize the various types of data 280-288 to each other after a crash. As such, the single packet synchronization means facilitates the provision of a data synchronization process that is less time consuming, costly and computationally intensive as compared to conventional data synchronization processes (such as those described above in the background section of this document).

As noted above, the DR 122 implements methods for synchronizing various types of data on a common packet (e.g., common packet 300 of FIGS. 3A-3C). These methods involve generating a common packet (e.g., common packet 300 of FIGS. 3A-3C) using various types of data 280-290 received by the DR 122 during operation of the aircraft 100, storing the common packet in a primary data store 260 of the DR 122, and storing a redundant copy of the common packet in a secondary data store 262 of the DR 122. Such methods will be described below in relation to FIGS. 4-5.

Exemplary Methods of the Present Invention

Figure 4:
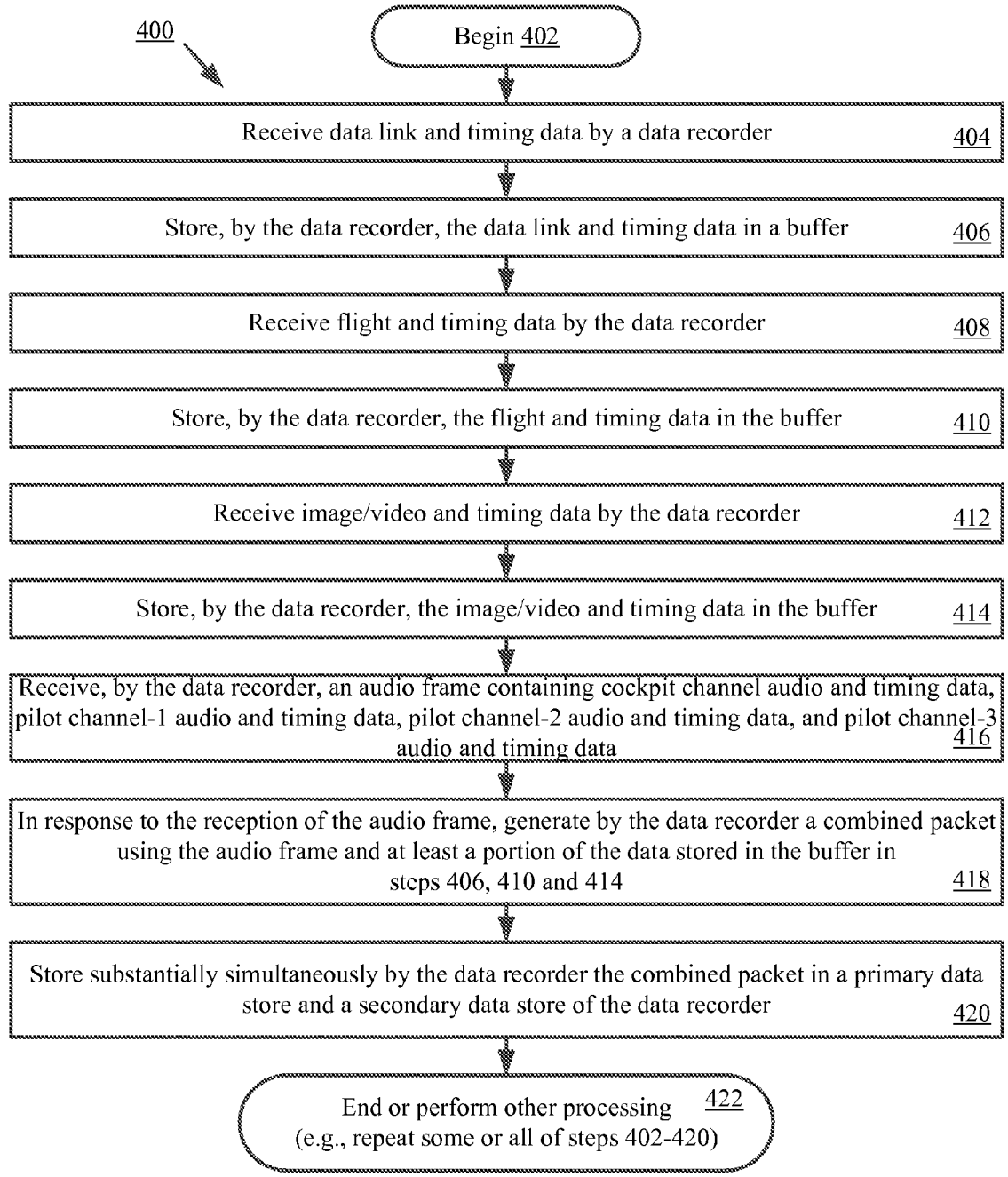
FIG. 4 is a flow diagram of an exemplary method for synchronizing a plurality of different types of data on a single packet that is useful for understanding the present invention.

Referring now to FIG. 4 there is provided a flow diagram of an exemplary method 400 for synchronizing various types of data on a single common packet (e.g., common packet 300 of FIGS. 3A-3C) that is useful for understanding the present invention. As shown in FIG. 4, the method 400 begins with step 402 and continues with step 404. In step 404, data link and timing data is received by a data recorder (e.g., data recorder 122 of FIGS. 1-2). Thereafter, the data recorder stores the received data link and timing data in an internal buffer (e.g., buffer 270 of FIG. 2), as shown by step 406. In a next step 408, the data recorder receives flight and timing data. The flight and timing data is also stored in the internal buffer, as shown by step 410. The data recorder also receives image/video and timing data in step 412. The image/video and timing data is stored in the internal buffer in step 414.

After completing step 414, the method 400 continues with step 416. Step 416 involves receiving, by the data recorder, an audio frame containing cockpit channel audio and timing data, pilot channel-1 audio and timing data, pilot channel-2 audio and timing data, and pilot channel-4 audio and timing data. Notably, every "N" (e.g., 40) milliseconds an audio frame is received by the data recorder. In response to the reception of the audio frame, step 418 is performed where the data recorder generates a combined packet (e.g., combined packet 300 of FIGS. 3A-3C). The combined packet is generated using the audio frame and at least a portion of the data stored in the internal buffer in steps 406, 410 and 414. The process for generating the combined packet will be described in detail below in relation to FIG. 5.

In a next step 420, the data recorder performs operations to store the combined packet in a primary data store (e.g., primary data store 260 of FIG. 2) and a secondary data store (e.g., secondary data store 262 of FIG. 2) thereof. The combined packet can be stored in the two (2) data stores substantially simultaneously. Upon completing step 420, step 422 is performed where the method 400 ends or other processing is performed. The other processing can involve repeating some or all of the method steps 404-420 every "N" (e.g., 40) milliseconds.

Figure 5:
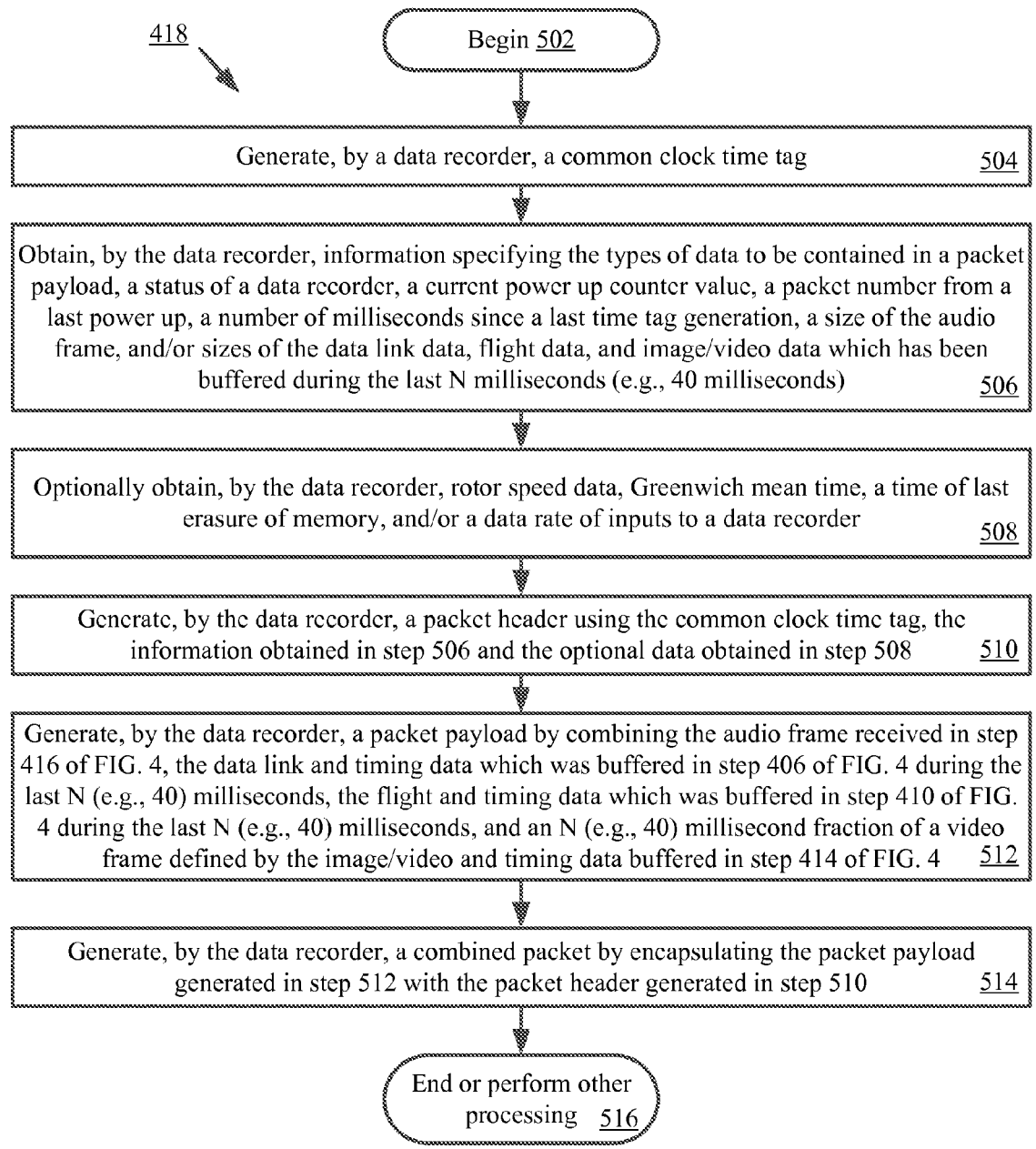
FIG. 5 is a flow diagram of an exemplary method for generating a common packet that is useful for understanding the present invention.

Referring now to FIG. 5, there is provided a flow diagram of an exemplary process for generating a common packet that is useful for understanding the present invention. The process of FIG. 5 can be performed in step 418 of FIG. 4. As shown in FIG. 5, the process begins with step 502 and continues with step 504. In step 504, the data recorder (e.g., data recorder 122 of FIGS. 1-2) generates a common clock time tag. Thereafter in step 506, the data recorder obtains various information. The information includes, but is not limited to, information specifying the types of data to be contained in a packet payload (e.g., packet payload 304 of FIGS. 3A and 3C), a status of a data recorder, a current power up counter value, a packet number from a last power up, a number of milliseconds since a last time tag generation, a size of the audio frame, and/or sizes of the data link data, flight data and image video data which has been buffered during the last "N" (e.g., 40) milliseconds. In a next step 508, the data recorder may optionally obtain rotor speed data, Greenwich mean time data, data defining a time of a last erasure of memory, and/or data defining a data rate of inputs to the data recorder.

After the completion of step 506 or 508, step 510 is performed where the data recorder generates a packet header (e.g., packet header 302 of FIGS. 3A and 3B). The packet header is generated using the common clock time tag, the information obtained in step 506 and/or the optional data obtained in step 508. Next, the data recorder generates a packet payload (e.g., the packet payload 304 of FIGS. 3A and 3C), as shown by step 512. The packet payload is generated by combining the audio frame received in step 416 of FIG. 4, the data link and timing data which was buffered in step 406 during the last "N" (e.g., 40) milliseconds, the flight and timing data which was buffered in step 410 during the last "N" milliseconds, and an "N" millisecond fraction of a video frame defined by the image/video and timing data buffered in step 414 of FIG. 4. Subsequent to generating the packet header and packet payload, the data recorder generates a combined packet (e.g., combined packet 300 of FIGS. 3A-3C), as shown by step 514. The combined packet is generated by encapsulating the packet payload generated in step 512 with the packet header generated in step 510. Thereafter, step 516 is performed where the process ends or other processing is performed.

In view of the forgoing, it should be apparent that the present invention provides a data recording system in which different types of data are synchronized on a single packet with a single time source and resolution of "N" (e.g., 40) milliseconds. Consequently, the present invention overcomes various drawbacks of conventional data recording systems. For example, the present invention provides a way to synchronize data which does not require a manual or automatic data synchronization process to be performed after a crash. As such, the present invention provides a data synchronization process that is less time consuming, costly, complex and computationally intensive as compared to conventional data synchronization processes (such as those described above in the background section of this document).

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for synchronizing data of a plurality of different data types on a single packet, comprising:
   receiving said data by an electronic circuit of a data recorder;
   receiving, by said electronic circuit, an audio frame containing voice data and timing data communicated over a plurality of channels;
   in response to the reception of said audio frame, generating a combined packet using said audio frame and at least a portion of said data; and
   storing, substantially simultaneously, said combined packet in a primary data store and a secondary data store of said data recorder for subsequent use in reconstructing events leading up to a crash of a land vehicle, aircraft or vessel;
   wherein said audio frame and said portion of data are time synchronized to each other on said combined packet.

2. The method according to claim 1, wherein said data comprises at least one of data link data, flight data and image/video data.

3. The method according to claim 1, wherein said plurality of channels comprises a cockpit channel and a plurality of pilot channels.

4. The method according to claim 1, wherein said combined packet is generated by encapsulating a packet payload with a packet header including a common clock time tag.

5. The method according to claim 4, wherein said packet header comprises information specifying at least one of said plurality of different data types, a current power up counter value, a packet number from a last power up, a number of milliseconds since a last time tag generation, a size of said audio frame, and a size of each type of data which has been buffered by said data recorder during a last "N" milliseconds.

6. The method according to claim 4, wherein said packet header comprises at least one of rotor speed data, Greenwich mean time data, data specifying a time of a last erasure of memory, and/or data specifying a data rate of inputs to said data recorder.

7. The method according to claim 4, wherein said packet payload comprises said audio frame and said portion of said data.

8. The method according to claim 4, where said portion of data comprises data link and timing data which was buffered by said data recorder during a last "N" milliseconds, flight and timing data which was buffered by said data recorder during a last "N" milliseconds, and an "N" millisecond fraction of a video frame defined by image/video and timing data buffered by said data recorder.

9. A method for synchronizing data of a plurality of different data types on a single packet, comprising:
   receiving said data by an electronic circuit of a data recorder;
   storing said data in a buffer of said data recorder;
   receiving, by said electronic circuit, an audio frame containing voice data and timing data communicated over a plurality of channels;
   in response to the reception of said audio frame, generating a combined packet using said audio frame and at least a portion of said data stored in said buffer, wherein said audio frame and said portion of data are time synchronized to each other on said combined packet; and
   storing, substantially simultaneously, said combined packet in a primary data store and a secondary data store of said data recorder for subsequent use in reconstructing events leading up to a crash of a land vehicle, aircraft or vessel;
   wherein said portion of data comprises data link data which was buffered by said data recorder during a last "N" milliseconds, flight data which was buffered by said data recorder during a last "N" milliseconds, and an "N" millisecond fraction of a video frame defined by image/video data buffered by said data recorder.

10. The data recorder according to claim 9, said plurality of channels comprises a cockpit channel and a plurality of pilot channels.

11. A data recorder, comprising:
    an electronic circuit configured to
      receive data of a plurality of different data types,
      receive an audio frame containing voice data and timing data communicated over a plurality of channels,
      generate a combined packet in response to the reception of said audio frame, said combined packet generated using said audio frame and at least a portion of said data, and
      substantially simultaneously store said combined packet in a primary data store and a secondary data store of said data recorder for subsequent use in reconstructing events leading up to a crash of a land vehicle, aircraft or vessel;
    wherein said audio frame and said portion of data are time synchronized to each other on said combined packet.

12. The data recorder according to claim 11, wherein said data comprises at least one of data link data, flight data and image/video data.

13. The data recorder according to claim 11, wherein said plurality of channels comprise a cockpit channel and a plurality of pilot channels.

14. The data recorder according to claim 11, wherein said combined packet is generated by encapsulating a packet payload with a packet header including a common clock time tag.

15. The data recorder according to claim 14, wherein said packet header comprises information specifying at least one of said plurality of different data types, a current power up counter value, a packet number from a last power up, a number of milliseconds since a last time tag generation, a size of said audio frame, and a size of each type of data which has been buffered by said data recorder during a last "N" milliseconds.

16. The data recorder according to claim 14, wherein said packet header comprises at least one of rotor speed data, Greenwich mean time data, data specifying a time of a last erasure of memory, and/or data specifying a data rate of inputs to said data recorder.

17. The data recorder according to claim 14, wherein said packet payload comprises said audio frame and said portion of said data.

18. The data recorder according to claim 14, where said portion of data comprises data link and timing data which was buffered by said data recorder during a last "N" milliseconds, flight and timing data which was buffered by said data recorder during a last "N" milliseconds, and an "N" millisecond fraction of a video frame defined by image/video and timing data buffered by said data recorder.

19. A data recorder, comprising:
a buffer; and
an electronic circuit configured to
- receive data of a plurality of different data types, store said data in said buffer;
- receive an audio frame containing voice data and timing data communicated over a plurality of channels,
- generate a combined packet in response to the reception of said audio frame, said combined packet generated using said audio frame and at least a portion of said data stored in said buffer, and
- substantially simultaneously store said combined packet in a primary data store and a secondary data store of said data recorder for subsequent use in reconstructing events leading up to a crash of a land vehicle, aircraft or vessel;

wherein said audio frame and said portion of data are time synchronized to each other on said combined packet; and wherein said portion of data comprises data link data which was buffered by said data recorder during a last "N" milliseconds, flight data which was buffered by said data recorder during a last "N" milliseconds, and an "N" millisecond fraction of a video frame defined by image/video data buffered by said data recorder.

20. The data recorder according to claim 19, said plurality of channels comprises a cockpit channel and a plurality of pilot channels.

\* \* \* \* \*